Patented June 25, 1940

2,205,796

UNITED STATES PATENT OFFICE 2,205,796

STABLE ICE COLOR PRODUCING COMPOSITION

Hans Z. Lecher, Plainfield, Frederic H. Adams, Somerville, and Henry Philip Orem, North Plainfield, N. J., assignors to American Cyanamid Company, New York, N. Y., a corporation of Maine No Drawing. Application December 23, 1939, Serial No. 310,822

10 Claims. (Cl. 8—45)

This invention relates to the art of dyeing and printing ice colors. Specifically it relates to new dye producing compositions and the processes for applying them on materials, particularly textile materials.

More specifically, the present invention relates to compositions comprising an ice color coupling component and a stabilized diazo compound. The stabilized diazo compounds used in this invention are condensation products of diazotized polynuclear amines free from solubilizing groups, with cyclic guanidyl sulfonic acids free from azoic coupling groups. The diazo components dealt with in the present invention will be referred to in the specification and claims as ice color diazo components because of their common use in this type of colors. Diazo compounds, diazotized amines and diazo components when referred to broadly will include compounds containing more than one diazo group or more than one amino group such as tetrazo compounds or diamines.

The present invention is based on the discovery that a coupling reaction will not take place in compositions containing condensation products of diazotized polynuclear amines free from solubilizing groups with cyclic guanidyl sulfonic acids free from azoic coupling groups and ice color coupling components, either in a solid blend or in alkaline solution, but does after treatment with acids that split the products into their original components. Therefore, these new dyes producing compositions are very useful in the art of printing ice colors as they can be stored and shipped as solid blends or alkaline solutions without premature dyestuff formation. They can also be used for making up stable alkaline printing pastes without producing color and then the color can be developed on the print by treatment with weak acids or acid vapors in the usual manner.

We do not, in the present application, claim as new compounds the stabilized diazo compounds used in the dye producing compositions of the present invention. These stabilized diazo compounds are a part of the subject matter of and are claimed in our copending application Serial Number 310,821 filed December 23, 1939, now Patent No. 2,200,926, and correspond most probably to the following general formula:

$$X—(N=N—G)_n$$

in which X is a radical of a polynuclear ice color diazo component, G is a radical of a cyclic guanidyl sulfonic acid or of its alkali metal or ammonium salt and $n$ is 1 or 2.

It is not certain just where the azo group connects with the guanidine radical and the present invention is not limited to any particular theory of the formula of the stabilized diazo compounds. The following typical formula is believed to be the most probable one, but it is possible that the azo group or the C=N double bond may be shifted to another nitrogen atom because of tautomerism:

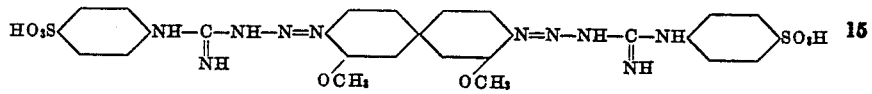

The present invention is not limited to the use of stabilized diazo compounds derived from any particular cyclic guanidyl sulfonic acid. On the contrary it is applicable to the use of derivatives of any cyclic guanidyl sulfonic acid as long as it contains a reactive hydrogen atom attached to a nitrogen atom and having been capable of reacting with the diazotized amine of the type referred to. Such cyclic guanidyl sulfonic acids are, e. g., guanidyl cyclohexane sulfonic acids, sulfobenzyl guanidines, guanidyl benzene sulfonic acids such as guanyl sulfanilic acid or guanyl metanilic acid or guanyl orthanilic acid, guanidyl naphthalene sulfonic acids such as guanyl naphthionic acid or guanyl Tobias acid; heterocyclic guanidyl sulfonic acids such as guanidyl benzothiazole sulfonic acids; disulfonic acids such as guanidyl benzene-2,5-disulfonic acid. However, the use of diazo compounds stabilized by the aid of cyclic guanidyl sulfonic acids which also contain a carboxylic group are not claimed in this application, as they constitute a part of the subject matter of and are claimed in the copending application Serial Number 310,820 filed December 23, 1939. The guanidyl group itself may be substituted as, e. g., in diphenyl guanidine monosulfonic acid. The radicals substituting the guanidyl groups or connecting the guanidyl groups with the sulfonic groups may be further substituted provided that the substituent does not make the radical capable of azoic coupling as hydroxyl or amino groups would do with an aromatic radical: thus 2-chloro-5-guanidyl toluene-4-sulfonic acid may be used as stabilizer.

It is an advantage of the present invention that the stabilized diazo compounds used may be derived from practically all polynuclear ice color diazo components including the type of compounds having the ring systems condensed and those in which the ring systems are not condensed with each other.

Typical polynuclear amines which may be diazotized or tetrazotized and reacted with cyclic guanidyl sulfonic acids are the following: amino biphenyls such as xenylamine, benzidine, o-tolidine, o-dianisidine, 3,3'-dichlorobenzidine. Alpha and beta naphthylamine, 1,3 diamino naphthalene, 2-methoxy-1-naphthylamine. Alpha amino anthraquinone. 2-amino-3-nitrofluorene and 2-amino-3-nitrofluorenone. Amino carbazoles such as 2-amino carbazole, 3,6 diamino carbazole, 2-nitro-3-amino carbazole. 2-nitro-3-amino dibenzofuran, 2-amino-3-nitro benzothiophene, 1-amino-5-fluorobenzothiazole. 4,4'-diamino stilbene. Amino diarylamines and their ether derivatives and their nitro derivatives such as, e. g., 2-methoxy-5-amino diphenylamine, 4-methoxy-4'-amino diphenylamine, 4-ethoxy-4'-amino diphenylamine, 3,4'-dinitro-4-amino diphenylamine, 4,4'-diamino diphenylamine, 2,2'-dimethyl-4,4'-diamino diphenylamine. Amino derivatives of aromatic ethers such as 2-amino diphenyl ether, 2-amino-4-acetyl diphenyl ether, benzyl-2-amino phenyl ether, 4-chloro 2-amino diphenyl ether, 4-amino-2-chloro diphenyl ether, 4-amino-4'-chloro diphenyl ether, 4,4'-dichloro-2-amino diphenyl ether, 2,2'-5'-trichloro-4-amino diphenyl ether. Mono acyl derivatives of diamines such as N-hexa hydro benzoyl p-phenylene diamine, N-hexahydro benzoyl p-toluylene diamine, N-benzoyl p-phenylene diamine, 2-benzoylamino-4-amino anisole, 2-hexahydrobenzoylamino-5-amino anisole, 2-amino-5-benzoylamino hydroquinone dimethyl ether and diethyl ether, 2-amino-5-furoyl amino hydroquinone dimethyl ether and diethyl ether and corresponding derivatives having instead of the furoyl group the radical of thiophene carboxylic acids. 2-amino-5-hexahydrobenzoylamino hydroquinone dimethyl ether and diethyl ether, 2-amino-5-phenoxyacetylamino hydroquinone diethyl ether, the monobenzyl and monophenyl urethane of 2,5-diamino hydroquinone dimethyl and diethyl ether, 1-amino-3-benzoylamino-4,6-dimethoxy benzene; analogous mono aroyl derivatives of 2,5-diamino-4-alkoxy toluenes and of 2,5-diamino-4-alkoxy chlorobenzenes and of 2,5-diamino-4-alkoxy benzene sulfo dialkylamides; analogous mono aroyl derivatives of 1,3-diamino-4-6-dimethyl benzenes; the diethyl amide of 2-amino-4-(4'-chlorophenoxy)-benzoic acid. Mono acyl derivatives of diamino p-chloro phenyl ethers such as, e. g., 2-amino-4-chloro-5-acetylamino diphenyl ether, 2-benzoylamino-4-chloro-5-amino anisole. Amino derivatives of aromatic sulfones such as, e. g., 3-amino-4-methyl diphenyl sulfone, 2-amino-4'-methyl diphenyl sulfone, 2-amino-4-acetyl diphenyl sulfone, the ethyl ester of 3-amino-4-(p-toluene sulfonyl) benzoic acid, (4-methoxy-3-amino phenyl)-benzyl sulfone, 4-ethoxy-3-amino diphenyl sulfone. Amino azo compounds such as, e. g., 3,2'-dimethyl-4-amino azo benzene, 2-methyl-4-amino-5-methoxy-4'-chloro azo benzene, 4-amino-4'-nitro-3-methoxy-6-methyl azo benzene, 4-amino-4'-nitro-2,5-dimethoxy azo benzene, 4-amino-4'-chloro-3-methoxy-6-methyl azo benzene, the azo dye: diazotized o-anisidine coupled on alpha naphthylamine, 2,5-dimethoxy-4-amino-2'-ethyl carboxy-4'-nitro azo benzene, 2-acetylamino-4-amino-5-methoxy-2'-methyl sulfo-4'-nitro azo benzene. Amino derivatives of polynuclear ketones such as, e. g., 2,5-dibenzoyl aniline. Amino diphenyl methanes such as, e. g., 2-benzyl-4-chloroaniline. Amino derivatives of aryl esters of aromatic sulfonic acids such as, e. g., 2-amino-benzene sulfonic acid phenyl ester, 2-amino-4-chlorobenzene sulfonic acid p-cresyl ester. Amino xanthones.

The stabilized diazo compounds used in the present invention contain a solubilizing sulfonic group and therefore most of them are soluble in aqueous alkali or in aqueous solutions of ammonia, of amines, or of quaternary ammonium bases. In the case of alkali and of the strong quaternary ammonium bases such as tetraethanol ammonium hydroxide only an equivalent amount or a slight excess of the base is required to promote solution, but in the case of the weaker bases such as ammonia and the various amines a larger excess is necessary.

When these new ice color producing compositions are to be solid blends, salts of the stabilized diazo compounds with alkali metals or with quaternary ammonium bases are mixed with the coupling components. In case the new compositions are prepared in the form of solutions the stabilized diazo compound and the coupling component are dissolved in an alkaline medium. Ammonia or amines may, in this case also, be used as bases provided they are applied in sufficient excess to promote solution; however, the use of alkali or quaternary ammonium bases is preferable. Quaternary ammonium bases and particularly those that contain hydroxyalkyl groups have a decidedly stabilizing action on the solutions. Some of the stabilized diazo compounds used in the present invention are also soluble in polar organic solvents such as alcohols or acetone, particularly when such solvents contain some water, and therefore solid blends with the coupling components may be dissolved and used as solutions in such solvents. Obviously all solutions must be kept on the alkaline side to prevent coupling.

The stabilized diazo compounds used in the present invention are very stable even at elevated temperatures and are not explosive which is an important property as many diazo compounds present considerable explosion hazards. Their good solubility in solutions of bases, as pointed out, is another important property and constitutes an additional advantage of the present invention. Their stability against alkaline hydrolysis and which prevents these diazo compounds from coupling in alkaline solution is also an important factor in the compositions of this invention.

The stabilized diazo compounds may be combined with any of the ice color coupling components such as beta-naphthol, 8-amino-2-naphthol, 8-acetylamino-2-naphthol, benzoyl naphthols; pyrazolones and pyrazyl pyrazolones; hydroxy benzofluorenones; hydroxy derivatives of phenyl naphthylamines such as 7-hydroxy-1-naphthyl-m-hydroxy phenylamine; particularly various N-substituted amides such as arylides of 2-hydroxy-3-naphthoic acid, of 5,6,7,8 tetrahydro-2-hydroxy-3-naphthoic acid, of 2-hydroxy-3-anthroic acid, of methyl and dimethyl salicylic acids, of hydroxy carbazole carboxylic acids, of hydroxy benzocarbazole carboxylic acids, of hydroxy benzoacridone carboxylic acids, of 3,7-dihydroxy naphthalene-2,6-dicarboxylic acid, of hydroxy dibenzofuran carboxylic acids, of hydroxy benzothiophene carboxylic acids, etc.; arylides of acetoacetic acid, of furoyl acetic acid, of terephthaloyl bis acetic acid. The arylide group in the coupling component may be a simple aromatic group such as the radical of aniline or of an aniline derivative or of naphthylamine, or it may be a radical of a diamine such as, e. g., of o-tolidine, or it may be the radical of a heterocyclic amine such as, e. g., of an amine of the benzothiazole series or of a diamine of the diphenylene oxide or diphenylene sulfide or diphenylene sulfone series. The ice color coupling component may also contain an azo group and even metallized azo dyes may be useful ice color coupling components such as, e. g., the copper complex of the combination p-chloro-o-amino phenol on resorcinol. Cutch may also be used as ice color coupling component.

The relative proportions of the stabilized diazo compound and the ice color coupling component present in these new compositions of matter may vary; however, we prefer to use approximately equivalent quantities, the coupling component being in slight excess. The mixtures may contain one or more reaction products of diazotized polynuclear ice color components with cyclic guanidyl sulfonic acids and one or more ice color coupling components since desirable shades are also obtained by using more than two components.

The mixture may also contain various assistants such as starches, gums, alkali, quaternary ammonium bases, wetting and dispersing agents.

The textile material is printed or impregnated with the mixture and then treated with an acid, preferably a weak acid, at elevated temperature. By this acid treatment the diazo-guanidine compound is hydrolyzed and coupled to form the azo dye. Acetic and formic acids give very favorable results, but many other weak acids, known to those skilled in the art, may be used with equally good effect. The acids may be applied either in the liquid or vapor state.

However, the ice color coupling component and the diazo compound need not be applied simultaneously, but the diazo compound may be applied after the coupling component with the same result.

When the ice color coupling component and stable diazo compound are printed as a mixture, it is possible to effect ageing in a somewhat different manner from that described above. The goods, if sufficiently acid resistant, such as animal fibres, may be impregnated with an acid substance such as, e. g., sulfuric acid, sodium bisulfate and the like. The print is then made and the material steamed. The acid in the material effects splitting and develops the color. This method of impregnating the goods with an acid is not practical with materials which are not acid resistant, such as the various cellulosic fibres. In such a case, however, it is possible to use a material which liberates acid only when treated with steam. Such potential acidic substances are, e. g., sodium monochloroacetate, ethylene monochlorhydrin, acid amides such as formamide, etc. The acid yielding material may be mixed with the printing paste, or the goods to be printed may be padded with the agent.

When the stabilized diazo compounds of the present invention are used in the form of salts with weak and volatile amines, or in solution in weak and volatile amines such as, e. g., diethyl ethanolamine, the development of the color may be accomplished by steam alone without any additional acid because the steam removes the amine and decreases the alkalinity of the printing paste. Furthermore, in making up the printing paste. If insufficient amounts of base are used and some of thhe stabilized diazo compound and of the coupling component remains undissolved, the prints may be developed with steam alone without any addition of acid or of a potential acid substance.

The processes of this invention produce excellent dyeings and printings on textile material as no side reactions take place in the formation of the azo dye. A further advantage is that the mixtures of the diazo compounds and the ice color coupling components are perfectly stable so that they may be stored without decomposition and explosion hazard. Furthermore, their alkaline printing pastes show a very high degree of stability and no premature formation of azo dyestuff takes place.

The processes of the present invention may also be used for simultaneous or separate printing with a different class of dyes, namely, the sulfuric acid esters of leuco compounds of vat dyes. It is an advantage of the present invention that composite prints are thus possible and it is not necessary to restrict the printing of goods to dyes of a single class.

Some typical mixtures of the present invention and their use in dyeing and printing textile materials will be illustrated in the following specific examples, it being understood, of course, that the invention is not broadly limited to particular details herein set forth. The parts are by weight.

*Example 1*

10.1 parts of o-tolidine are stirred with 50 parts of water for 30 minutes and then 59.5 parts of hydrochloric acid (1.19) are added and the stirring is continued 30 minutes. The temperature is lowered to 0° C. and the diamine is tetrazotized by the addition of 22 parts of 35% of sodium nitrite solution in about one hour. Ice is added as necessary to keep the temperature below 10° C. The tetrazo solution is filtered before use.

23.65 parts of guanyl sulfanilic acid are added to the above tetrazo solution, cooled to 10° C. and then 145.7 parts of 5N sodium hydroxide solution are added. The solution is stirred 15 hours at 15 to 20° C. and the reaction is complete as shown by a negative diazo test with alkaline R salt. The temperature is lowered to 10° C. and 30 parts of sodium chloride per 100 parts of solution are added. The precipitated material is filtered, pressed, and dried at 25° C. in a vacuum. After grinding the product shows a red brown color and is readily soluble in water.

7.5 parts of this sodium salt of the condensation product (47.3% real) of tetrazotized o-tolidine and guanyl sulfanilic acid are intimately mixed with 2.09 parts of diacetoacetyl o-tolidide.

5 parts of this mixture are pasted with 5 parts of ethylene glycol monoethyl ether and 2.5 parts of 30° Bé. caustic, and 17.5 parts of water are added. The solution so obtained is thickened by addition of 70 parts of starch paste as a printing thickener. The color paste is printed on cotton cloth from a copper roll, the print is dried and the color developed by ageing with steam in the presence of acetic acid vapors. The developed print is rinsed, soaped at elevated temperature, rinsed, acid dried. A reddish yellow print of good fastness properties is obtained.

If instead of diacetoacetyl o-tolidide an equivalent quantity of 2-hydroxy-3-naphthoic acid anilide is employed, a strong blue print of good fastness properties is obtained.

Development of the color by ageing in the presence of other weak acids such as formic or formic and acetic acids may be accomplished.

When the use of an ager is inconvenient, the print may be developed by immersion in an acid bath at elevated temperature, such as one containing 20 parts of glacial acetic acid, 20 parts of formic acid (85%) and 30 parts of Glauber's salt.

Example 2

42.2 parts of 3,3'-dichlorobenzidine dihydrochloride (38.6% real base) are carefully pasted with 50 parts of water. 59.5 parts of hydrochloric acid (1.19) are added and the slurry is stirred for 30 minutes. The temperature is then lowered to 0° C. and the diamine is tetrazotized with 8.75 parts of sodium nitrite dissolved in 35 parts of water. The tetrazotization required about 15 minutes. 42.2 parts of guanidyl benzene-2,5-disulfonic acid are added to the filtered tetrazo solution and the temperature is lowered to 10° C. Then 210 parts of 5N potassium hydroxide solution are added. The reaction is complete after 30 minutes as shown by a negative test on spotting with alkaline R salt. 33 parts of potassium carbonate per 100 parts of solution are added and the solution is cooled to 5° C. and stirred 15 minutes. The precipitated material is filtered, pressed and dried at 25° C. under vacuum. After grinding it shows a red-brown color, and is readily soluble in water.

7.11 parts of this dipotassium salt of the condensation product (80.2% real) of tetrazotized 3,3'-dichlorobenzidine and guanidyl benzene-2,5-disulfonic acid are intimately mixed with 2.91 parts of 2-hydroxy-3-naphthoic acid o-toluidide. A printing paste is prepared from this mixture in a manner similar to that described in Example 1. The color paste is printed on cotton cloth from a copper roll, the print is dried and the color developed by ageing with steam in the presence of acetic acid vapors. The developed print is rinsed, soaped at elevated temperature, rinsed, and dried.

A reddish violet print of good fastness properties is obtained.

Example 3

15.7 parts of o-dianisidine dihydrochloride are stirred with 50 parts of water for 30 minutes, and then 59.5 parts of hydrochloric acid (1.19) are added, and the stirring is continued for 30 minutes. The temperature is then lowered to 0° C. by the addition of ice and the diamine is tetrazotized by the addition of 25 parts of a 35% solution of sodium nitrite. This addition requires one hour, and the temperature is kept below 10° C. by the addition of ice. The tetrazo solution is filtered before use.

23.65 parts of guanyl sulfanilic acid are added to the tetrazo solution so prepared and then 169.6 parts of 5N sodium hydroxide solution are added. The solution is stirred at 15° to 20° C. for 15 hours when the reaction is complete as shown by a negative diazo test on spotting with alkaline R salt. The solution is filtered and the temperature of the filtrate is lowered to 10° C. 30 parts of sodium chloride per 100 parts of solution are added and the precipitated material is filtered, pressed, and dried at 25° C. under vacuum. After grinding the product shows a brown color and is soluble in water.

7.14 parts of this sodium salt of the condensation product (51.9% real) of tetrazotized o-dianisidine and guanyl sulfanilic acid are intimately mixed with 2.91 parts of 2-hydroxy-3-naphthoic acid o-toluidide.

A printing paste is prepared from this mixture in a manner similar to that described in Example 1. The color paste is printed on cotton cloth from a copper roll, the print is dried and the color developed by ageing with steam in the presence of acetic acid vapors. The developed print is rinsed, soaped at elevated temperature, rinsed and dried.

A strong blue print of good fastness properties is obtained.

If instead of 2-hydroxy-3-naphthoic acid o-toluidide there is substituted an equivalent quantity of 2-hydroxy-3-naphthoic acid anilide, a blue print of lighter shade is obtained.

Example 4

Cotton piece goods are padded with an alkaline solution of the anilide of 2-hydroxy-3-naphthoic acid in the usual manner and dried. The padded cloth is printed from a copper roll with the following paste:

| | Parts |
|---|---|
| The sodium salt of the condensation product (47.3% real) of tetrazotized o-tolidine and guanyl sulfanilic acid (prepared according to Example 1) | 2.5 |
| Ethylene glycol monoethyl ether | 5.0 |
| Sodium hydroxide (30° Bé.) | 2.5 |
| Water | 25.0 |
| Starch paste | 65.0 |
| Total | 100.0 |

The printed goods are dried and developed with live steam containing acetic acid vapors. The developed print is rinsed, soaped at elevated temperature, rinsed, and dried. A print of blue shade is obtained.

Example 5

9.2 parts of benzidine are stirred with 50 parts of water for 30 minutes and then 29.5 parts of hydrochloric acid (1.19) are added and the stirring is continued 30 minutes. The temperature is lowered to 0° C. by the addition of ice. The diamine is then tetrazotized by the addition of 7.5 parts of sodium nitrite dissolved in 30 parts of water. This addition requires 30 minutes. The filtered tetrazo solution is cooled to 10° C. and 30 parts of guanyl Tobias acid (2-guanidyl-naphthalene-1-sulfonic acid) are added. Then 148 parts of 5N potassium hydroxide solution are added and the reaction mixture is stirred for 15 hours at which time the reaction is complete as shown by a negative test on spotting with alkaline R salt. The precipitated material is filtered off and dried at 25° C. under vacuum. After grinding, the product showed a brown color.

10 parts of this potassium salt of the condensation product (52.6% real) of tetrazotized benzidine and guanyl Tobias acid (2-guanidyl naphthalene-1-sulfonic acid) are intimately mixed with 4.46 parts of 2-hydroxy-3-naphthoic acid o-phenetidide.

A printing paste is prepared from this mixture in a manner similar to that described under Example 1. The color paste is printed on cotton cloth from a copper roll, the print is dried, and the color developed by ageing with steam in the presence of acetic acid vapors. The developed print is rinsed, soaped at elevated temperature, rinsed, and dried.

A reddish violet print is obtained.

What we claim is:

1. A color producing composition of matter which comprises an ice color coupling component and a stabilized diazo compound having the following general formula:

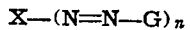

in which X is a radical of a polynuclear ice color diazo component, G is a radical included in the group consisting of cyclic guanidyl sulfonic acid radicals free from carboxylic groups and free from azoic coupling groups, and their alkali metal and ammonium salts, and $n$ is a whole number included in the group consisting of 1 and 2.

2. A color producing composition of matter which comprises an ice color coupling component and a stabilized diazo compound having the following general formula:

$$X—(N=N—G)_2$$

in which X is a radical of a polynuclear ice color diazo component, G is a radical included in the group consisting of cyclic guanidyl sulfonic acid radicals free from carboxylic groups and free from azoic coupling groups, and their alkali metal and ammonium salts.

3. A color producing composition of matter which comprises an ice color coupling component and a stabilized diazo compound having the following general formula:

$$X—(N=N—G)_2$$

in which X is a radical of the biphenyl group and G is a radical included in the group consisting of cyclic guanidyl sulfonic acid radicals free from carboxylic groups and free from azoic coupling groups, and their alkali metal and ammonium salts.

4. A color producing composition of matter which comprises an ice color coupling component and a stabilized diazo compound having the following general formula:

$$X—(N=N—G)_2$$

in which X is a radical of the biphenyl group and G is a radical included in the group consisting of the guanidyl benzene sulfonic acid radicals and their alkali metal and ammonium salts.

5. A color producing composition of matter which comprises the benzidide of acetoacetic acid and a stabilized diazo compound having the following formula:

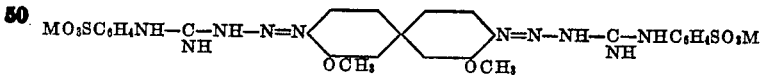

in which M represents a member of the group consisting of hydrogen, alkali metals or ammonium radicals.

6. A color producing composition of matter which comprises an arylide of 2-hydroxy naphthalene-3-carboxylic acid and a stabilized diazo compound having the following general formula:

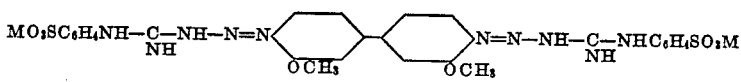

in which M represents a member of the group consisting of hydrogen, alkali metals or ammonium radicals.

7. An alkaline printing paste comprising a printing thickener associated with a mixture of an ice color coupling component and a stabilized diazo compound having the following general formula:

$$X—(N=N—G)_n$$

in which X is a radical of a polynuclear ice color diazo component, G is a radical included in the group consisting of cyclic guanidyl sulfonic acid radicals free from carboxylic groups and free from azoic coupling groups, and their alkali metal and ammonium salts and $n$ is a whole number included in the group consisting of 1 and 2, the paste being capable of developing color by treatment with weak acids at elevated temperature.

8. A process of coloring materials which comprises applying to the material a composition containing an ice color coupling component and a stabilized diazo compound having the following general formula:

$$X—(N=N—G)_n$$

in which X is a radical of a polynuclear ice color diazo component, G is a radical included in the group consisting of cyclic guanidyl sulfonic acid radicals free from carboxylic groups and free from azoic coupling groups, and their alkali metal and ammonium salts and $n$ is a whole number included in the group consisting of 1 and 2; and subjecting the material to the action of weak acids at elevated temperature.

9. A method of printing which comprises printing the material with an alkaline printing paste containing a mixture comprising an ice color coupling component and a stabilized diazo compound having the following general formula:

$$X—(N=N—G)_n$$

in which X is a radical of a polynuclear ice color diazo component, G is a radical included in the group consisting of cyclic guanidyl sulfonic acid radicals free from carboxylic groups and free from azoic coupling groups, and their alkali metal and ammonium salts and $n$ is a whole number included in the group consisting of 1 and 2; and developing the color by subjecting the material to the action of a weak acid at elevated temperature.

10. A method of coloring material which comprises applying to the material an ice color coupling component, then applying a dispersion of a stabilized diazo compound having the following formula:

$$X—(N=N—G)_n$$

in which X is a radical of a polynuclear ice color diazo component, G is a radical included in the group consisting of cyclic guanidyl sulfonic acid radicals free from carboxylic groups and free from azoic coupling groups, and their alkali metal and ammonium salts and $n$ is a whole number included in the group consisting of 1 and 2; and then developing the color by subjecting the material to the action of a weak acid at elevated temperature.

HANS Z. LECHER.
FREDERIC H. ADAMS.
HENRY PHILIP OREM.

DISCLAIMER 2,205,796.—*Hans Z. Lecher*, Plainfield, *Frederic H. Adams*, Somerville, and *Henry Philip Orem*, North Plainfield, N. J. STABLE ICE COLOR PRODUCING COMPOSITION. Patent dated June 25, 1940. Disclaimer filed June 17, 1942, by the assignee, *American Cyanamid Company*.

Hereby disclaims claims 1, 2, 3, 4, 6, 7, 8, 9, and 10.

[*Official Gazette July 21, 1942.*]